United States Patent
Brandt et al.

(10) Patent No.: US 7,989,769 B2
(45) Date of Patent: Aug. 2, 2011

(54) IN-CABINET THERMAL MONITORING METHOD AND SYSTEM

(75) Inventors: David D. Brandt, New Berlin, WI (US); David L. Jensen, Barnevelt, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 326 days.

(21) Appl. No.: 12/195,965

(22) Filed: Aug. 21, 2008

(65) Prior Publication Data

US 2010/0044567 A1  Feb. 25, 2010

(51) Int. Cl.
*H01L 31/00* (2006.01)
*G01N 21/94* (2006.01)

(52) U.S. Cl. ........ 250/330; 250/334; 250/342; 340/653; 348/82; 348/373; 374/124; 356/430

(58) Field of Classification Search .......... 340/635, 340/540, 588, 653; 250/330, 334, 341.6, 250/338.1; 374/4, 5, 124; 348/143, 164, 348/165, 373; 356/430
See application file for complete search history.

(56) References Cited

U.S. PATENT DOCUMENTS

| | | | | |
|---|---|---|---|---|
| 3,803,413 A * | 4/1974 | Vanzetti et al. | | 250/338.1 |
| 4,809,308 A * | 2/1989 | Adams et al. | | 378/98.2 |
| 5,206,503 A * | 4/1993 | Toops | | 250/234 |
| 5,208,528 A * | 5/1993 | Quintard | | 324/158.1 |
| 5,250,809 A * | 10/1993 | Nakata et al. | | 250/330 |
| 5,808,303 A * | 9/1998 | Schlagheck et al. | | 250/330 |
| 7,502,068 B2 * | 3/2009 | Narayanaswami et al. | | 348/373 |
| 2004/0208354 A1 * | 10/2004 | Vilella | | 382/145 |
| 2006/0237427 A1 * | 10/2006 | Logan | | 219/401 |

* cited by examiner

*Primary Examiner* — George A Bugg
*Assistant Examiner* — Anne V Lai
(74) *Attorney, Agent, or Firm* — Boyle Fredrickson LLP; Alexander R. Kuszewski; John M. Miller

(57) ABSTRACT

Thermographic imaging equipment is incorporated directly into cabinets housing electrical switchgear to provide for dedicated, nearly continuous monitoring of the contained equipment. A mechanical scanning technique may allow low-cost sensors to provide essentially continuous thermographic monitoring. Dedicated thermal imaging equipment allows automatic analysis through predefined temperature threshold maps.

15 Claims, 4 Drawing Sheets

IN-CABINET THERMAL MONITORING METHOD AND SYSTEM

CROSS-REFERENCE TO RELATED APPLICATIONS

STATEMENT REGARDING FEDERALLY SPONSORED RESEARCH OR DEVELOPMENT

BACKGROUND OF THE INVENTION

The present invention relates generally to thermographic monitoring of electrical equipment and, in particular, to a system allowing automatic in-cabinet thermographic monitoring.

Preventive and predictive maintenance strategies monitor equipment to avoid costly repair and lost production associated with unexpected equipment failures. Preventative maintenance institutes regularly scheduled monitoring of electrical equipment, component replacement, and minor repairs. Predictive maintenance uses monitored data to more accurately assess maintenance scheduling and equipment replacement.

Thermographic monitoring can be used with preventive and predictive maintenance and employs cameras that are sensitive in the far infrared region (typically 3-15 µm) to provide non-contact thermal measurement of surface temperatures of equipment. Particularly for electronic equipment, such thermographic images may provide advanced warning of equipment failure that would not otherwise be apparent. High temperatures may indicate, for example, high resistance electrical junctions, overvoltage or overcurrent, damaged insulation or damaged conductors that may ultimately lead to catastrophic failure. A thermographic image can be taken while the equipment is in operation with minimal operator risk. Further, a thermographic image can simultaneously measure multiple components allowing rapid monitoring of many potential failure points.

There are a number of limitations to thermographic imaging. First, the equipment is relatively expensive and requires a trained operator to perform inspections and analyze the images. Second, although the inspections do not require contact with equipment, they can expose the operator to the risks attendant to being near operating equipment, e.g. arc flash and explosions. These risks can be minimized to some extent by the provision of infrared transparent ports or openable shutters in the equipment cabinets allowing the operator to perform the inspection without opening the equipment housings. Finally, the thermographic monitoring is necessarily periodic and may miss rapidly developing equipment failures.

One method of providing substantially continuous monitoring of electrical equipment is the attachment of thermal sensors (such as thermocouples or solid-state devices) directly to various portions of the equipment to provide for real time thermal monitoring. Such instrumentation of equipment can be complex and expensive if multiple points are to be monitored and is generally impractical for custom installations. The wiring attendant to such monitoring presents additional risk of short-circuits within the cabinet.

SUMMARY OF THE INVENTION

The present invention provides a low-cost, multipoint thermal monitoring system that avoids some of the disadvantages of conventional thermal monitoring by using thermographic cameras permanently installed in equipment cabinets. This is made practical, as a cost matter, through the use of a scanning camera system that may be relatively slow, and yet practical for an in-cabinet system that does not require the attendance of a human operator. The use of dedicated thermal cameras permits sophisticated automatic monitoring systems that isolate different components and track thermal conditions as a function of a state of an ancillary control process.

Specifically then, the present invention provides an electrical component cabinet including a housing providing fire resistant walls enclosing a housing volume and providing at least one internal component mounting panel within the housing volume for the attachment of electrical components thereto. A thermographic camera is attached to a housing wall opposite the mounting panel for imaging the electrical components, the thermographic camera being sensitive in the region of 3-15 µm. A remote monitoring station is provided communicating with the thermographic camera via an electrical connection to receive thermographic images of components attached to the internal component-mounting panel.

It is thus one object of the invention to provide automated multipoint thermal monitoring.

The thermographic camera may provide a mechanically scanned thermally sensing element.

It is thus an object of the invention to provide an extremely cost-effective thermographic camera taking advantage of the fact that relatively slow imaging is acceptable in a stationary camera system.

The mechanical scanning may use a mirror system scanning the mounting panel.

It is thus an object of the invention to provide for a compact thermographic camera.

Alternatively, the mechanical scanning may use a track for moving the thermally sensing element.

It is thus an object of the invention to provide a camera system having an extremely large field of view.

The housing may include an access door and the track may include two vertical rails flanking the door and a horizontally extending carriage moving along the vertical rails and supporting the thermally sensing element for movement therealong. The system may include a camera parking system for moving the carriage to an extreme point on the tracks when the door is opened.

It is thus an object of the invention to provide a front view of the electrical components that does not interfere with access to the components through the cabinet door.

The thermally sensing element may be a pyroelectric element.

Is thus an object of the invention to provide an extremely low-cost thermal imaging element.

The mounting panel may be on a wall of the housing opposite a door providing access to the housing and the thermographic camera may be attached to an inner surface of the door.

It is thus an object of the invention to provide a mounting that provides a good view of multiple electrical components without interference with those components.

The electrical connection may be a network connection.

It is thus an object of the invention to allow multiple cabinets to be readily monitored.

The electrical connection may be a radio transceiver system.

It is thus an object of the invention to eliminate the need for direct electrical connection between the remote station and the camera, simplifying installation.

The remote monitoring may evaluate received thermographic images on a predetermined schedule to provide an alarm if a predetermined temperature threshold is exceeded.

It is thus an object of the invention to provide more nearly continuous monitoring than can be obtained using a human operator and a thermographic camera.

The remote monitoring station may provide at least one mask corresponding to a thermographic image from the thermographic camera; the mask may provide temperature thresholds for different mask regions. The remote monitoring station may automatically compare temperatures of the thermographic image within the different mask regions to the temperature thresholds associated with the masked regions to generate an alarm when the temperature thresholds are exceeded for a given mask region.

It is thus an object of the invention to provide for custom multipoint monitoring allowing different temperature thresholds for different components.

The remote monitoring station may communicate with a controller activating electrical components mounted to the mounting panel in a series of control states and the remote monitoring station may select among different masks corresponding to different control states for the generation of the alarm.

It is thus an object of the invention provide a monitoring that may be dynamically adjusted according to component operating state.

The remote monitoring station may monitor successive thermographic images to detect degradation associated with dirt accumulating on optics of the thermographic camera to generate an alarm when the degradation exceeds a predetermined threshold. For example, the detected degradation may be a decrease in thermographic contrast.

It is thus an object of the invention to accommodate contamination problems incident to permanent installation of thermographic cameras in electrical cabinets.

These particular objects and advantages may apply to only some embodiments falling within the claims and thus do not define the scope of the invention.

DETAILED DESCRIPTION OF THE PREFERRED EMBODIMENT

Figure 1:
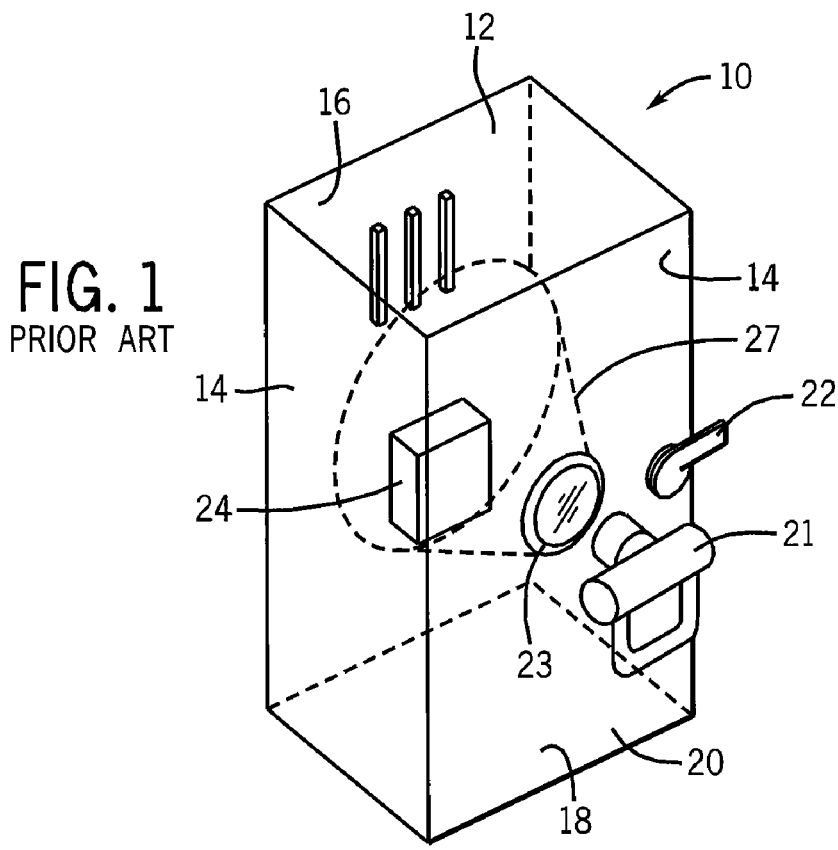
FIG. 1 is a perspective view, in phantom, of a standard electrical cabinet holding switchgear components, the cabinet having an infrared port for thermographic monitoring of the switchgear components.

Referring now to FIG. 1, a switchgear cabinet 10 may have a rear vertical wall providing a mounting panel 12 surrounded by forwardly extending sidewalls 14, top wall 16 and bottom wall 18 to provide a protected volume enclosed by front door 20 opposite the mounting panel 12. Typically the cabinet 10 is constructed of steel panels to provide a strong and fire resistant housing.

The front door 20 may be opened and closed for access to the enclosed volume in the cabinet 10 by means of a handle 22 which may turn to lock the cabinet 10 and which may be connected to an electrical interlock (not shown) or the like to disconnect power from the cabinet 10 when the door 20 is opened. The door 20 may support a port 23 providing either an infrared transparent window or an openable shutter allowing viewing of internal components by a thermographic camera 21 by a human operator while providing maximum protection to the operator.

The cabinet 10 may include multiple electrical components 24, for example: circuit breakers, disconnects, contactors, over-load relays, motor starters, and switches. The electrical components 24 are characterized by having internal conductors rated for handling powers in excess of 100 volt-amperes such as present a potential of destructive electrical overheating. The electrical components 24 may be mounted on the mounting panel 12 to be, ideally, within an inspection cone 27 defined by the port 23 and the optics of the camera 21.

Figure 2:
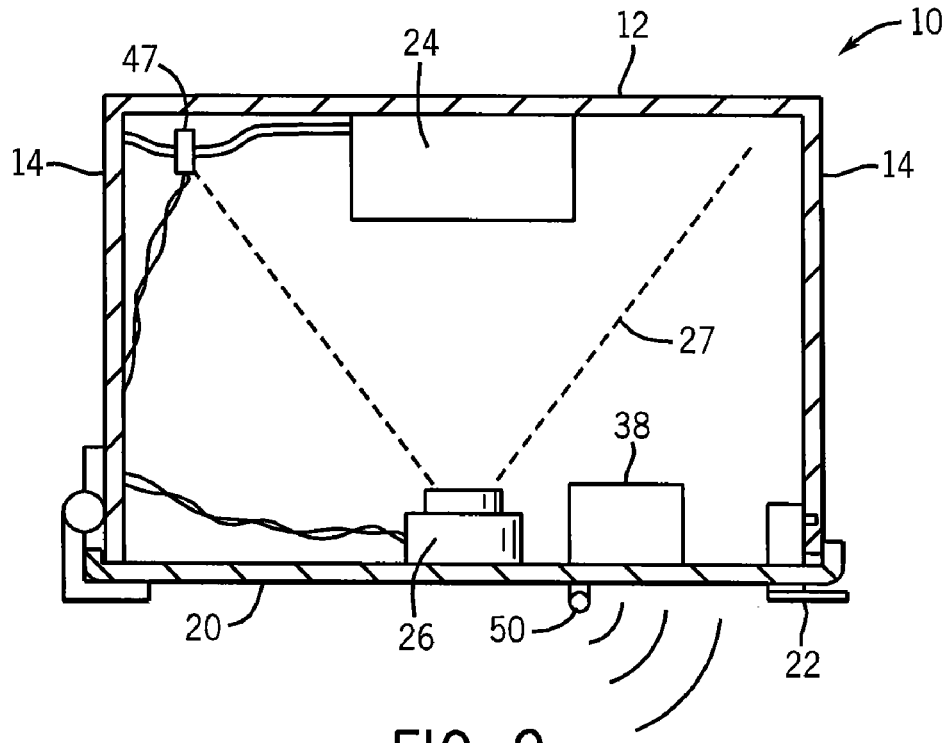
FIG. 2 is a cross-section along the horizontal plane through a cabinet similar to that of FIG. 1 showing a first embodiment of the invention mounting a dedicated thermographic camera on a front wall of the cabinet for monitoring of components inside the cabinet.

Referring now to FIG. 2, in the present invention a port 23 may be eliminated and a thermographic camera 26 may be mounted on the inner surface of the door 20 to provide an inspection cone 27 also subtending the electrical components 24.

Figure 3:
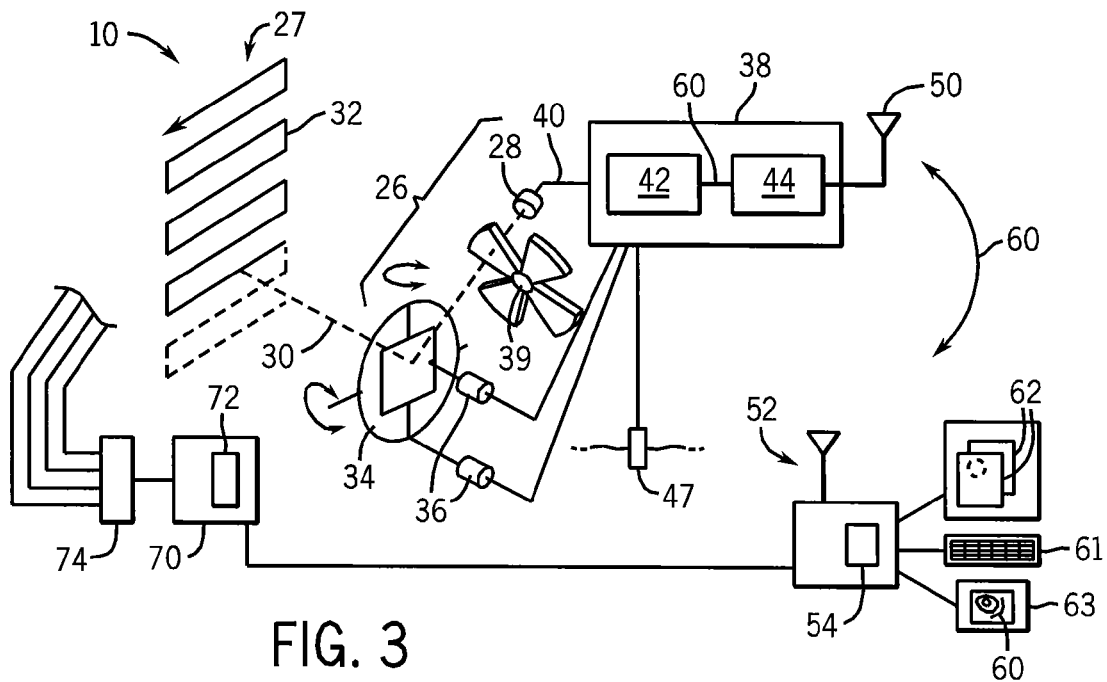
FIG. 3 is a block diagram of a camera system of FIG. 2 providing for a mechanical scanning using a mirror and a wireless connection to a remote station in communication with an industrial controller.

Referring also to FIG. 3, in the first embodiment, the camera 26 may include a single infrared sensitive element 28 whose optical axis 30 may be scanned in a raster pattern 32 within the inspection cone 27 by means of a gimbaled mirror 34 tipping about an x and y axis under the control of servo-motors 36 controlled by a camera acquisition unit 38. Infrared transmissive optics (not shown), either in the form of a front surface focusing mirror or a Fresnel lens may be used to provide a spot field of view suitable for scanning. Alternatively collimation type systems, for example a tube or the like, may be used.

The optical axis 30 may be chopped by a mechanical blade system 39 as is known in the art to permit absolute temperature assessments and to eliminate problems of thermal drift. A signal 40 obtained from the infrared sensitive element 28 may be received by an image reconstructor 42 which maps values of the signal 40 to points in the raster pattern 32 to produce a thermographic image 60 in much the same manner as a photograph. The thermographic image 60 may be provided to a transmitter 44 having any antenna 50 outside of the cabinet 10 for transmitting the thermographic image 60 to a remote station 52.

Power for the acquisition unit 38 may be obtained by a current transformer or tap 47 that may be attached to power wiring elsewhere in the cabinet 10 for simple installation. Because the inside of the door 20 is typically free from circuitry and has a good vantage point of the electrical components 24, retrofit installations may be readily had.

Figure 4:
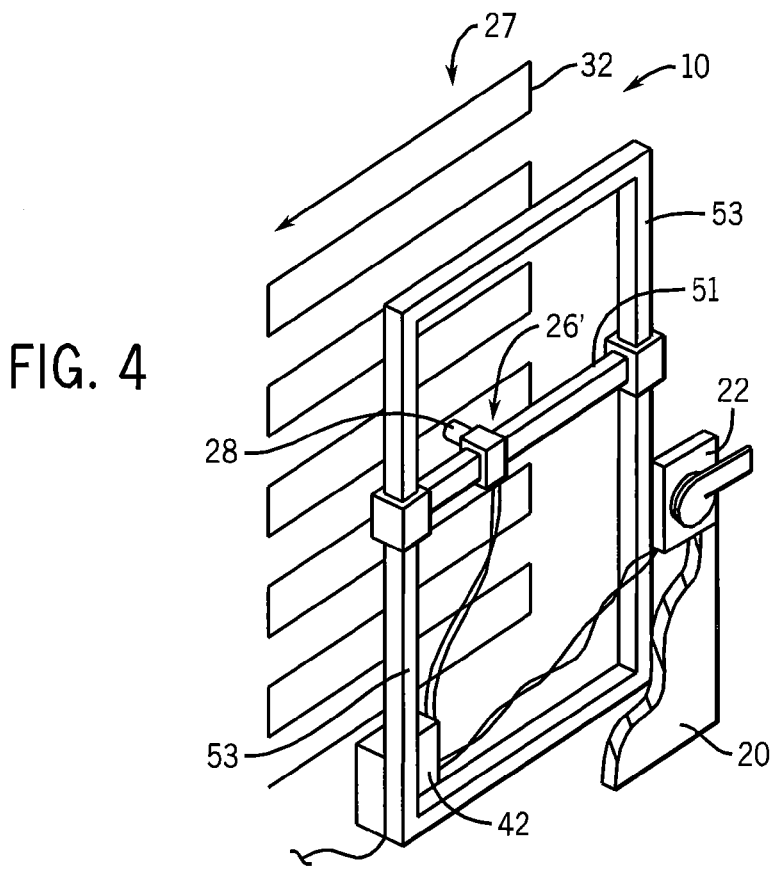
FIG. 4 is a perspective view in phantom of the cabinet of FIG. 1 employing a thermographic camera providing for mechanical scanning using a track assembly.

Referring now to FIG. 4, in an alternative embodiment, the thermographic camera 26' may provide for an infrared sensitive element 28 that is scanned in a raster pattern matching the raster pattern 32. In this case, the infrared sensitive element 28, for example, may be held on a horizontal track 51 to be moved therealong under computer control, for example, from the acquisition unit 38, the latter driving a stepper motor and belt system in the horizontal track 51 of a type known in the art. Horizontal track 51 may in turn be suspended by its ends on vertical tracks 53 preferably flanking the opening of the door 20 to be out of the way of the door 20. The attachment between the horizontal track 51 and the vertical tracks 53 allows movement of the horizontal track 51 vertically also under control of the acquisition unit 38 using stepper motors and belt systems in the vertical tracks 53 of a type known in the art.

This version of the camera 26' may provide for an extremely large acquisition cone 27, being effectively the area of the raster 32, and simplified optics without the need for focusing lenses or the like, which however may be used if desired.

A signal from the door handle 22, which typically also provides for an electrical interlock to the internal components 24, may be provided to the acquisition unit 38 to move the horizontal track 51 to a park position at either fully up or fully down limits to allow ready access to the interior of the cabinet 10 through the door 20.

Figure 5:
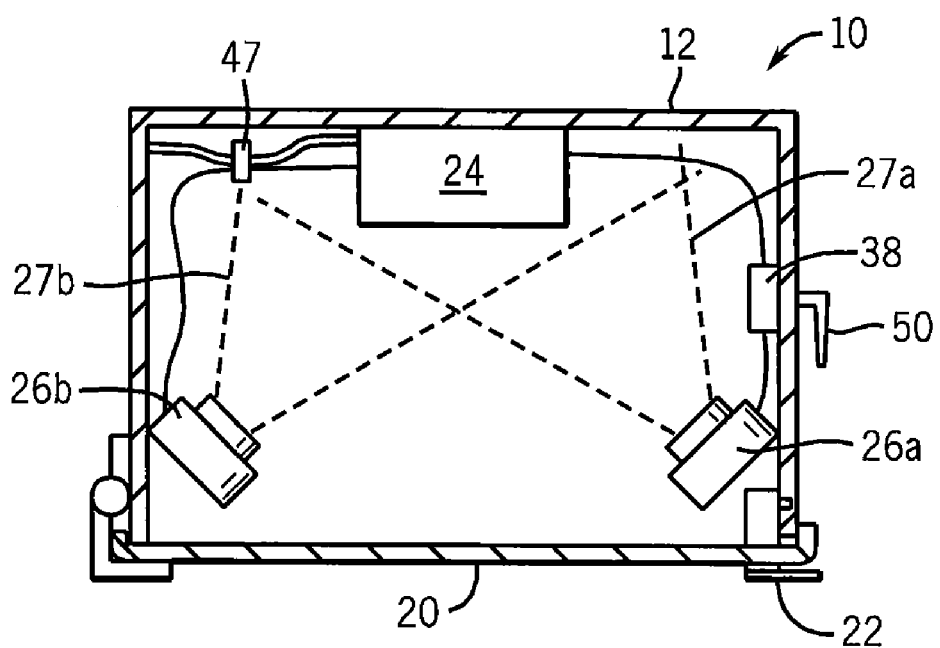
FIG. 5 is a figure similar to that of FIG. 2 showing the use of two cameras to provide for more complete component coverage.

Referring now to FIG. 5, in yet an alternative embodiment, two cameras 26a and 26b may be mounted opposite the mounting panel 12 on sidewalls 14 to provide overlapping inspection cones 27a and 27b providing improved visibility of components throughout the cabinet 10 including when mounted on the sidewalls 14. Because the cameras 26b and 26a need not be mounted on the door 20, in-cabinet wiring may be simplified.

Figure 6:
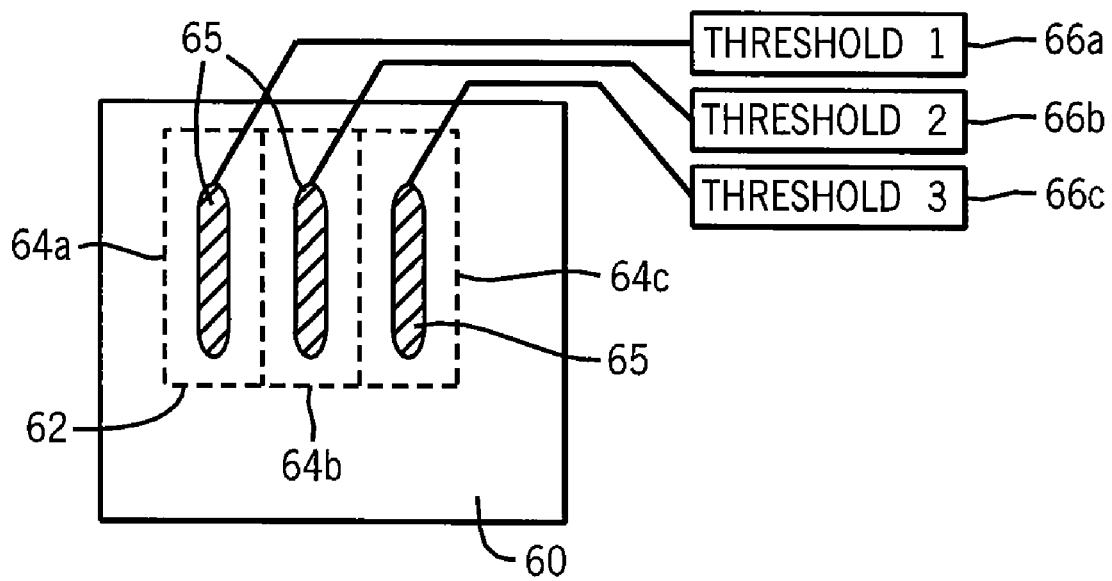
FIG. 6 is a simplified representation of image masks used by the remote station for establishing different temperature thresholds for different portions of the thermographic image.

Referring still to FIGS. 3 and 6, the remote station 52 may receive the thermographic images 60 on a regular schedule, for example, using a polling system implemented by software program 54 held in the remote station 52. In the polling system, the remote station 52 requests image data from the acquisition units 38 of one or more cabinets 10 using a periodic polling message. Alternatively a data "push" system may be used allowing the acquisition units 38 to transmit on periodic schedule, for example, at different times on the same channel or on different channels.

Upon receipt of the thermographic images 60, the remote station 52 matches each incoming thermographic image 60 to a mask 62 for that particular cabinet 10. The mask 62 defines multiple regions 64a, 64b, and 64c within the image 60 that are in turn mapped to predetermined temperature thresholds 66a, 66b, and 66c. The regions 64 may circumscribe particular component images 65 to identify pixels within the image 60 associated with a particular component 24 and thus the temperature of the component 24 isolated from other components 24. In this way, the thermographic images 60 may be automatically analyzed, and if the temperature in a particular mask region 64 exceeds its corresponding temperature threshold 66 an alarm may be sounded. By defining multiple regions 64a, 64b, and 64c within each image 60, components 24 (or elements of components 24) that are normally hotter may be given thresholds that are higher than elements that normally run cooler.

The remote station 52 may communicate with data entry devices 61 for the entry of custom temperature thresholds and for defining the masks (for example by drawing on thermographic images 60) presented on an attached display 63.

Referring again to FIG. 3, preferably the remote station 52 may communicate with a programmable logic controller 70 of the type known in the art, for example, as manufactured by Rockwell Automation Inc. of Milwaukee, Wis., executing a control program 72 for the control of industrial machines and processes implemented, in part, through the electrical components 24. In particular, the programmable logic controller 70 may communicate through one or more I/O modules 74 directly with the electrical components 24 or with elements that control the electrical components 24. In this way, the remote station 52 may have state knowledge of the control process and may select different masks 62 depending on the state of the machine and thus the state of the electrical components 24.

Figure 7:
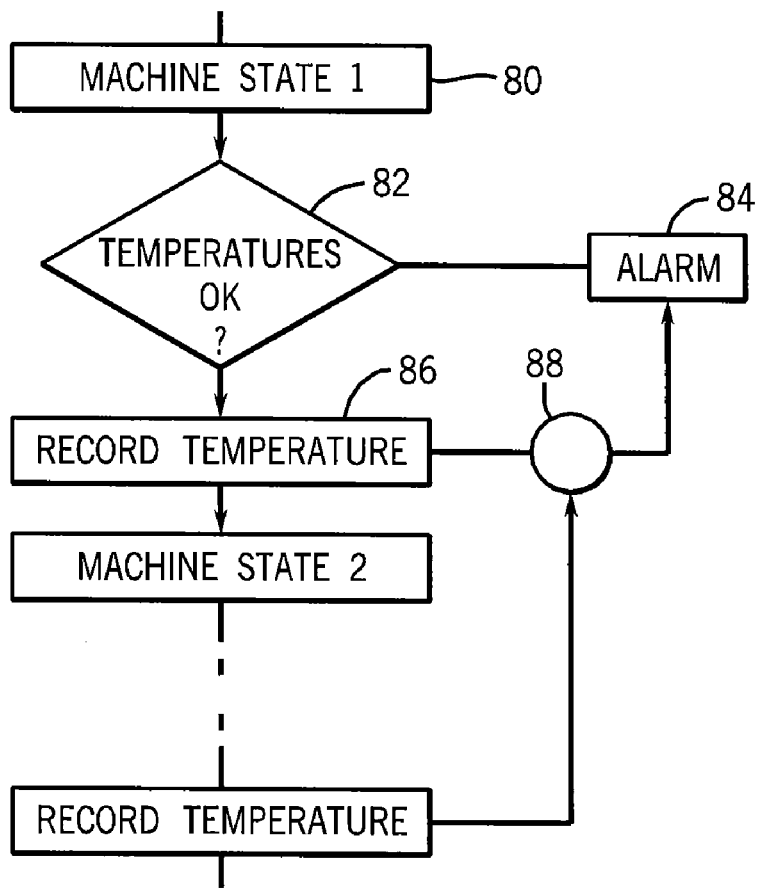
FIG. 7 is a portion of a flowchart implemented by the remote station for providing control state awareness in the thermographic monitoring.

Thus, referring to FIG. 7, at each machine state 80 determined from the programmable logic controller 70, an appropriate mask 62 may be selected and the temperature distribution may be evaluated at decision block 82 according to that mask 62. In this way, for example, when the electrical components 24 are in an idle state, a mask 62 having low temperature thresholds 66 may be used to detect aberrant operating conditions providing improved sensitivity. If the temperature for that state 80 is exceeded, an alarm may be sounded as indicated by process block 86. In contrast, when the electrical components 24 are being exercised by control of the process, a mask 62 having higher temperature thresholds 66 may be used to decrease false alarms.

The temperatures at each state 80 may be recorded per process block 86 and those temperatures used, for example, in comparison with temperatures at other states 80' to help establish an alarm threshold 66 as indicated by process block 88. Thus, for example, idle temperatures may be used to establish a baseline for operating temperatures.

Figure 8:
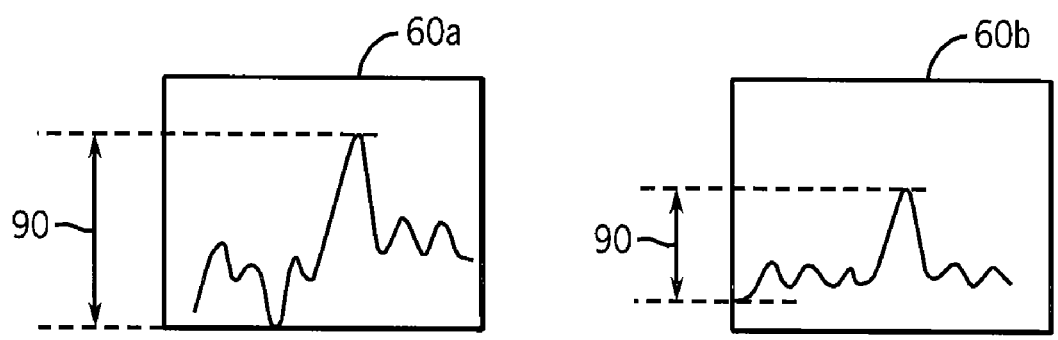
FIG. 8 is a one-dimensional representation of two successive thermographic images showing processing for determination of optical degradation caused, for example, by contamination of the thermographic camera.

Referring now to FIG. 8, successive images 60a and 60b (here depicted as a single image line) may be statistically analyzed to detect the degradation of the optics of the camera 26, for example dirt on the lens or mirror system. One particular algorithm for detecting dirt may consider the range 90 or variance of the new data of the thermographic image 60 being computed according to standard statistical techniques. A decrease in variance may, for example, indicate that the lens is dirty and thus trigger maintenance by a human operator.

The present invention has been described in terms of the preferred embodiment, and it is recognized that equivalents, alternatives, and modifications, aside from those expressly stated, are possible and within the scope of the appending claims.

We claim:

1. An electrical component cabinet comprising:
a housing providing fire resistant walls enclosing a housing volume;
at least one internal component mounting panel within the housing volume for an attachment of electrical components thereto;
a thermographic camera attached to a housing wall opposite the mounting panel for imaging electrical components attached to the mounting panel, the thermographic camera sensitive in a light frequency of 3-15 µm;
a remote monitoring station; and
an electrical connection between a thermographic camera and the remote monitoring station relaying thermographic images of components attached to the internal component mounting panel to the remote monitoring station for monitoring thereof
wherein the thermographic camera provides a mechanically scanned thermally sensing element
wherein the mechanical scanning provides a track for moving the thermally sensing element
wherein one housing wall provides an access door and the track includes two rails flanking the door and a carriage spanning the rails and moving along the rails and supporting the thermally sensing element for movement therealong, and further including a camera parking system for moving the carriage to an extreme point on the track when the door is opened.

2. An electrical component cabinet comprising:

a housing providing fire resistant walls enclosing a housing volume;

at least one internal component mounting panel within the housing volume for an attachment of electrical components thereto;

a thermographic camera attached to a housing wall opposite the mounting panel for imaging electrical components attached to the mounting panel, the thermographic camera sensitive in a light frequency of 3-15 μm;

a remote monitoring station; and an electrical connection between a thermographic camera and the remote monitoring station relaying thermographic images of components attached to the internal component mounting panel to the remote monitoring station for monitoring thereof wherein the remote monitoring station provides at least one mask corresponding to a thermographic image from the thermographic camera, the mask providing temperature thresholds for different mask regions; and wherein the remote monitoring station automatically compares temperatures of the thermographic image within the different mask regions to the temperature thresholds associated with the masked regions to generate an alarm when the temperature thresholds are exceeded for a given mask region;

wherein the remote monitoring station further communicates with a controller activating electrical components mounted to the mounting panel in a series of control states, and wherein the remote monitoring station selects among different masks corresponding to different control states for a generation of the alarm.

3. The electrical component cabinet of claim 2 wherein the thermographic camera provides a mechanically scanned thermally sensing element.

4. The electrical component cabinet of claim 3 wherein the mechanical scanning provides a mirror system scanning the mounting panel.

5. The electrical component cabinet of claim 3 wherein the mechanical scanning provides a track for moving the thermally sensing element.

6. The electrical component cabinet of claim 2 wherein the thermally sensing element is a pyroelectric element.

7. The electrical component cabinet of claim 2 wherein the mounting panel is on a wall of the housing opposite a door providing access to the housing and wherein the thermographic camera is attached to an inner surface of the door.

8. The electrical component cabinet of claim 2 wherein the electrical connection is a network connection.

9. The electrical component cabinet of claim 2 wherein the electrical connection is a radio transceiver system.

10. The electrical component cabinet of claim 2 wherein the remote monitoring evaluates received thermographic images on a predetermined schedule to provide an alarm if a predetermined temperature threshold is exceeded.

11. An electrical component cabinet comprising:

a housing providing fire resistant walls enclosing a housing volume;

at least one internal component mounting panel within the housing volume for an attachment of electrical components thereto;

a thermographic camera attached to a housing wall opposite the mounting panel for imaging electrical components attached to the mounting panel, the thermographic camera sensitive in a light frequency of 3-15 μm;

a remote monitoring station; and an electrical connection between a thermographic camera and the remote monitoring station relaying thermographic images of components attached to the internal component mounting panel to the remote monitoring station for monitoring thereof;

wherein the remote monitoring station monitors successive thermographic images to detect degradation associated with dirt accumulating on optics of the thermographic camera to generate an alarm when the degradation exceeds a predetermined threshold.

12. The electrical component cabinet of claim 2 further including electrical components attached to the mounting panel selected from the group consisting of: circuit breakers, disconnects, contactors, overload relays, switches, and motor starters.

13. A thermographic monitoring system comprising:

a thermographic camera providing a means for attachment of the thermographic camera to an interior wall of an electrical cabinet for imaging a mounting panel within the electrical cabinet having electrical components attached thereto, the thermographic camera providing a mechanically scanned thermally sensing element;

a remote monitoring station communicating with the thermographic camera for receiving from the thermographic camera thermographic images of electrical components attached to the mounting panel, wherein the remote monitoring station provides at least one mask corresponding to a thermographic image from the thermographic camera, the mask providing temperature thresholds for different mask regions; and wherein the remote monitoring station automatically compares temperatures of the thermographic image within the different mask regions to the temperature thresholds associated with the mask regions to generate an alarm when the temperature thresholds are exceeded for a given mask region wherein the remote monitoring station further communicates with a controller activating electrical components mounted to the mounting panel in a series of control states, and wherein the remote monitoring station selects among different masks corresponding to different control states for the generation of the alarm.

14. A thermographic monitoring system comprising:

a thermographic camera providing a means for attachment of the thermographic camera to an interior wall of an electrical cabinet for imaging a mounting panel within the electrical cabinet having electrical components attached thereto, the thermographic camera providing a mechanically scanned thermally sensing element;

a remote monitoring station communicating with the thermographic camera for receiving from the thermographic camera thermographic images of electrical components attached to the mounting panel, wherein the remote monitoring station provides at least one mask corresponding to a thermographic image from the thermographic camera, the mask providing temperature thresholds for different mask regions; and wherein the remote monitoring station automatically compares temperatures of the thermographic image within the different mask regions to the temperature thresholds associated with the mask regions to generate an alarm when the temperature thresholds are exceeded for a given mask region;

wherein the remote monitoring station monitors successive thermographic images to detect degradation associated with dirt accumulating on optics of the thermographic camera to generate an alarm when the degradation exceeds a predetermined threshold.

15. The thermographic monitoring system of claim 14 wherein the detected degradation is a decrease in thermographic contrast.

* * * * *